US012769512B2

(12) United States Patent
Romain et al.

(10) Patent No.: US 12,769,512 B2
(45) Date of Patent: Oct. 20, 2026

(54) ELECTRONIC MULTIPLICATION CIRCUIT AND CORRESPONDING MULTIPLICATION METHOD

(71) Applicants: STMicroelectronics (Rousset) SAS, Rousset (FR); STMicroelectronics (Alps) SAS, Grenoble (FR)

(72) Inventors: Fabrice Romain, Rians (FR); Fabien Journet, Grenoble (FR)

(73) Assignees: STMICROELECTRONICS (ALPS) SAS, Grenoble (FR); STMICROELECTRONICS (ROUSSET) SAS, Rousset (FR)

( * ) Notice: Subject to any disclaimer, the term of this patent is extended or adjusted under 35 U.S.C. 154(b) by 1196 days.

(21) Appl. No.: 17/744,337

(22) Filed: May 13, 2022

(65) Prior Publication Data

US 2022/0391171 A1 Dec. 8, 2022

(30) Foreign Application Priority Data

Jun. 2, 2021 (FR) ....................................... 2105795

(51) Int. Cl.
*G06F 7/523* (2006.01)
*G06F 21/55* (2013.01)

(52) U.S. Cl.
CPC ............ *G06F 7/523* (2013.01); *G06F 21/556* (2013.01); *G06F 2221/034* (2013.01)

(58) Field of Classification Search
CPC .......... G06F 7/523; G06F 7/4876; G06F 7/50; G06F 7/485; G06F 7/5443; G06F 21/556; G06F 2221/034; G06F 2207/7219; G06F 9/30036; G06F 2207/7223; G06F 2207/7238; G06F 2207/7257
See application file for complete search history.

(56) References Cited

U.S. PATENT DOCUMENTS 6,341,299 B1 * 1/2002 Romain ................ G06F 7/5443 708/523
9,575,725 B1 * 2/2017 Langhammer .......... G06F 7/485
2008/0130871 A1 * 6/2008 Gemmeke ........... G06F 13/4217 380/28
2009/0010424 A1 1/2009 Qi et al.
2013/0262544 A1 10/2013 Lee et al.
2017/0286063 A1 * 10/2017 Kaluzhny ............... G06F 7/588
2018/0152288 A1 5/2018 Kang et al.
2021/0105134 A1 * 4/2021 Choi ......................... G06F 7/78

OTHER PUBLICATIONS

Parhami, B., "Algorithms and Hardware Designs," Computer Arithmetic, Second Edition, UCSB, Apr. 2020, 96 pages.

* cited by examiner

*Primary Examiner* — James Trujillo
*Assistant Examiner* — Jakob Oscar Gudas
(74) *Attorney, Agent, or Firm* — Slater Matsil, LLP

(57) ABSTRACT

In an embodiment, after a first phase of multiplication, in an electronic multiplication circuit, of a first operand by a second operand leading to a successive delivery of least significant words of the result of the first multiplication, a second multiplication, of the first operand by a supplementary operand is implemented in the electronic multiplication circuit, during a second phase of multiplication. The supplementary operands are not all identical.

22 Claims, 6 Drawing Sheets

[Fig 2]
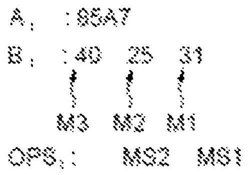
[Fig 3]
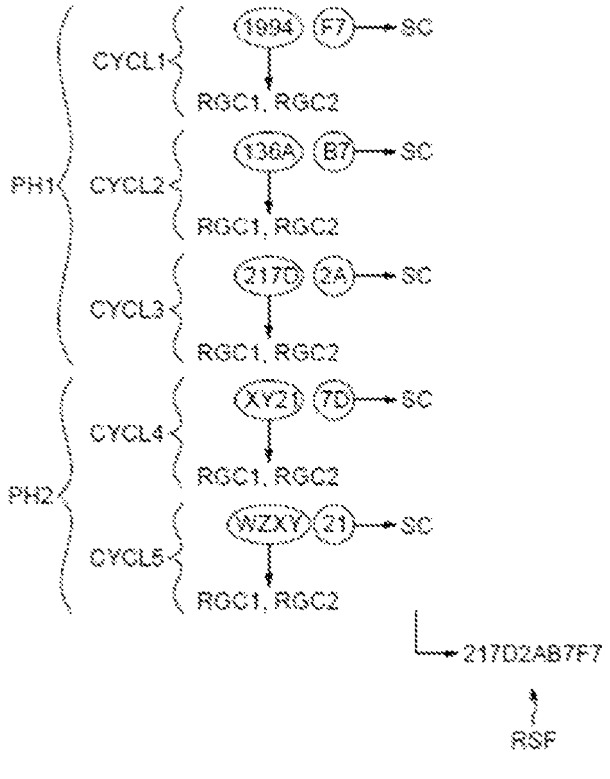

[Fig 7]
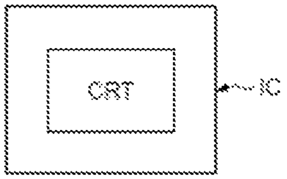

ELECTRONIC MULTIPLICATION CIRCUIT AND CORRESPONDING MULTIPLICATION METHOD

CROSS-REFERENCE TO RELATED APPLICATIONS

This application claims the benefit of French Application No. 2105795, filed on Jun. 2, 2021, which application is hereby incorporated herein by reference.

TECHNICAL FIELD

The present disclosure relates generally to an electronic system and method, and, in particular embodiments, to an electronic multiplication circuit and corresponding multiplication method.

BACKGROUND

A side channel attack made on an electronic device requires synchronisation of the consumption curves acquired during the operation of the device.

However, the consumption signature of current electronic multiplication circuits facilitates such resynchronisation since the consumption signature is not regular, in particular at the end of the multiplication operation. As a result, the various phases of the multiplication can be identified and used to make the aforementioned synchronisation.

SUMMARY

There is consequently a need to smooth the current consumption of a multiplication circuit as much as possible during operation thereof so as to make a distinction between the various multiplication phases more difficult and consequently to make an attempt at synchronisation with a view to a side channel attack more difficult.

Some embodiments and implementations relate to the multiplication of operands in an electronic multiplication circuit and more particularly the smoothing of the current consumption of such a circuit during multiplication operations, in particular to make attacks by auxiliary channels (known to a person skilled in the art as SCAs: "side channel attacks") more difficult.

In an embodiment, after a first phase of multiplication, in an electronic multiplication circuit, of a first operand by a second operand leading to a successive delivery of least significant words of the result of the first multiplication, a second multiplication, of the first operand by a supplementary operand is implemented in the electronic multiplication circuit, during a second phase of multiplication, generating a current consumption substantially equivalent to that of the first phase and allowing the delivery of most significant words of the result of the multiplication carried out in the first phase of multiplication. The supplementary operands are not all identical.

According to one embodiment, it is proposed, after a first phase of multiplying a first operand by a second operand leading to a successive delivery of least significant words of the result of this first multiplication, to proceed, during a second phase, with a second multiplication, referred to as a false multiplication or fictitious multiplication, of the first operand by a supplementary operand generating a current consumption substantially equivalent to that of the first phase and making it possible to deliver most significant words of the result of the multiplication carried out in the first phase.

Thus, according to one aspect, a method is proposed for multiplying a succession of first operands by a succession of second operands in an electronic multiplication circuit.

The electronic multiplication circuit includes a multiplier stage connected to a carry save adder stage known to a person skilled in the art.

The electronic multiplication circuit also includes a circuit output connected to a first output interface of the adder stage and an accumulation stage (for example formed by two accumulation registers) looped between a second output interface and an input interface of the adder stage.

The method comprises, for each first operand and the corresponding second operand, a first phase including, in the circuit, a first multiplication of the first operand by the second operand including successive deliveries, to the circuit output, of the least significant word or words of the result of the first multiplication from successive extractions of data from the first output interface, as well as a storage of data representing the most significant word or words of the result of the first multiplication in the accumulation stage.

The method also comprises a second phase including, in the circuit, a second, or false, multiplication of the first operand by a supplementary operand including a sequential extraction from the accumulation stage of the data representing the most significant word or words of the result of the first multiplication.

Furthermore, the supplementary operands respectively associated with the first operands are not all identical.

In the second phase, the second multiplication is said to be false since, although a multiplication operation between the first operand and the supplementary operand is implemented in the multiplier stage and the adder stage, the result words delivered to the circuit output do not correspond to the words of the result of the multiplication of the first operand by the supplementary operand since these are most significant words of the result of the first multiplication carried out in the first phase.

Furthermore, during this second so-called false multiplication, some data circulating internally in the multiplication circuit are different from the data that would correspond to an exact multiplication between the first operand and the supplementary operand.

Use of the supplementary operand therefore makes it possible to implement a multiplication operation in the circuit, even if this multiplication is false, while allowing extraction of the most significant words of the result of the first multiplication.

Furthermore, since not all the supplementary operands are all identical, and may for example be similar in their content to second operands, and for example selected in a pseudo-random manner, the current consumption of the circuit is similar in the first phase and in the second phase and it then becomes difficult to identify these phases, and in particular the end of the first phase, so as to use this information to make a synchronisation with a view to a possible side channel attack.

According to one embodiment, it is advantageous that the second phase also includes a bit selection and a storage of these selected bits in locations of the accumulation stage intended to store the data representing the most significant word or words of the result of the second or false multiplication.

This makes it possible to smooth the current consumption even more and to make it even more difficult to distinguish between the two phases of the method.

This bit selection may be a pseudo-random selection.

These bits may for example be generated by a pseudo-random generator or these selected bits may for example be selected from the bits delivered by the second output interface of the adder stage.

As indicated above, the supplementary operands may be selected pseudo-randomly, for example by using a pseudo-random generator.

In practice, each second operand may include a series of a plurality of digital words and each supplementary operand may include a succession of supplementary digital words.

The first phase then includes a delivery of the digital words to the multiplier stage and the second phase includes a delivery of the supplementary digital words to the multiplier stage.

In some embodiments, not all the supplementary digital words are all identical, there also, so as to avoid obtaining a non-regular consumption curve.

The supplementary digital words may also be selected pseudo-randomly.

According to another aspect, an electronic multiplication circuit is proposed, comprising

- a first circuit input for receiving a succession of first operands;
- a second circuit input for receiving a succession of second operands;
- a third circuit input for receiving a succession of supplementary operands;
- a multiplier stage connected to the first circuit input and selectively to the second circuit input or to the third circuit input and having a multiplier output connected to a first input interface of a carry save adder stage;
- a circuit output connected to a first output interface of the adder stage;
- an accumulation stage looped between a second output interface and a second input interface of the adder stage;
- a configurable control circuit having
  - a first configuration wherein, for each first operand and the corresponding second operand, they are configured to allow a first multiplication of the first operand by the second operand and to implement successive deliveries to the circuit output of the least significant word or words of the result of the first multiplication from successive extractions of data from the first output interface of the adder stage and a storage of data representing the most significant word or words of the result of the first multiplication in the accumulation stage, and
  - a second configuration wherein they are configured to allow a second or false multiplication of the first operand by a supplementary operand including a sequential extraction from the accumulation stage of the data representing the most significant word or words of the result of the first multiplication, the supplementary operands respectively associated with the first operands not all being identical; and
- a command circuit configured to place the control circuit in the first configuration and then in the second configuration.

According to one embodiment, the control circuit is furthermore configured for making, in the second configuration, a selection of bits, a storage of these selected bits in locations of the accumulation stage intended to store the data representing the most significant word or words of the result of the second or false multiplication.

According to one embodiment, the control circuit is configured to make a pseudo-random selection of the bits.

According to one embodiment, the control circuit is configured to make the selection of the bits, among the bits delivered by the second output interface of the adder stage.

According to one embodiment, the supplementary operands are pseudo-random operands.

According to one embodiment, each second operand includes a series of a plurality of digital words, each supplementary operand includes a succession of supplementary digital words, and the control circuit is configured to deliver, in the first configuration, the digital words to the multiplier stage, and to deliver, in the second configuration, the supplementary digital words to the multiplier stage, and not all the supplementary digital words are all identical.

According to one embodiment, the supplementary digital words are pseudo-random words.

According to one embodiment, the first output interface of the adder stage includes:

- a first output connected to the circuit output and intended to successively deliver least significant words of results representing a first partial sum produced by the carry save adder stage; and
- a second output connected to the circuit output and intended to successively deliver the least significant words of a corresponding second partial sum produced by the carry save adder stage.

In some embodiments, the second output interface of the adder stage comprises:

- a first output intended to successively deliver the other words of the results representing the first partial sum; and
- a second output intended to successively deliver the other words of the corresponding second partial sum.

In some embodiments, the accumulation stage comprises:

- a first accumulation register connected as an input to the first output of the second output interface; and
- a second accumulation register connected as an input to the second output of the second output interface.

According to one embodiment, each first operand is a word of n bits and each second operand includes a series of digital words of k bits, the first accumulation register and the second accumulation register each have a size of n bits, and the circuit is configured to be timed by a clock signal, and, during successive cycles of the clock signal,

- the first output of the first output interface of the adder stage is intended to successively deliver least significant words of k bits of results representing the first partial sum,
- the second output of the first output interface of the adder stage is intended to successively deliver the least significant words of k bits of the corresponding second partial sum,
- the first output of the second output interface includes a first elementary output intended to deliver the $n-k$ least significant bits of the other successive words of the results representing the first partial sum, and a second elementary output intended to deliver the k most significant bits of the other successive words of the results representing the first partial sum, and
- the second output of the second output interface includes a third elementary output intended to deliver the $n-k$ least significant bits of the other successive words of the second partial sum, and a fourth elementary output intended to deliver the k most significant bits of the other successive words of the second partial sum.

According to one embodiment, the control circuit comprises:

an input multiplexer having a first input connected to the second circuit input, a second input connected to the third circuit input and an output connected to the multiplier stage, a first multiplexer having a first input connected to the first output of the first output interface of the adder stage, a second input connected to a first output of the first accumulation register intended to deliver the k bits of ranks 0 to k−1 stored in this first accumulation register, an output connected to the circuit output by means of an output adder, a second multiplexer having a first input connected to the second output of the first output interface of the adder stage, a second input connected to a first output of the second accumulation register intended to deliver the k bits of ranks 0 to k−1 stored in this second accumulation register, an output connected to the circuit output by means of the output adder, a third multiplexer having a first input connected to the first elementary output, a second input connected to a second output of the first accumulation register intended to deliver the n−k bits of ranks k to n−1 stored in this first accumulation register, and an output connected to the n−k locations of ranks n−k−1 to 0 of the first accumulation register, and a fourth multiplexer having a first input connected to the third elementary output, a second input connected to a second output of the second accumulation register intended to deliver the n−k bits of ranks k to n−1 stored in this second accumulation register and an output connected to the n−k locations of ranks n−k−1 to 0 of the second accumulation register.

According to one embodiment, the second elementary output is directly connected to k locations of rank n−k to n−1 of the first accumulation register and the fourth elementary output is directly connected to k locations of ranks n−k to n−1 of the second accumulation register.

According to a more advantageous embodiment, the control circuit also comprises a fifth multiplexer having a first input connected to the second elementary output, a second input for receiving k selected bits and an output connected to the k locations of ranks n−k to n−1 of the first accumulation register, a sixth multiplexer having a first input connected to the fourth elementary output, a second input for receiving the k selected bits and an output connected to the k locations of ranks n−k to n−1 of the second accumulation register.

According to one embodiment, the control circuit is configured to connect the first respective inputs of all the multiplexers to their respective output in the first configuration, and to connect the second respective inputs of all the multiplexers to their respective output in the second configuration.

According to one embodiment n is a multiple of k.

In some embodiments, each second operand includes for example a series of J digital words, each supplementary operand includes for example a succession of P supplementary digital words, with P equal to n/k, and the command means are advantageously configured to place the control means in their first configuration during J cycles of the clock signal and then in their second configuration during P cycles of the clock signal.

BRIEF DESCRIPTION OF THE DRAWINGS

Other advantages and features of the invention will emerge from the examination of the detailed description of embodiments and implementations, which are in no way limitative, and the accompanying drawings, on which:

FIGS. 1-7 illustrate schematically embodiments and implementations of the invention.

DETAILED DESCRIPTION OF ILLUSTRATIVE EMBODIMENTS

Figure 1:
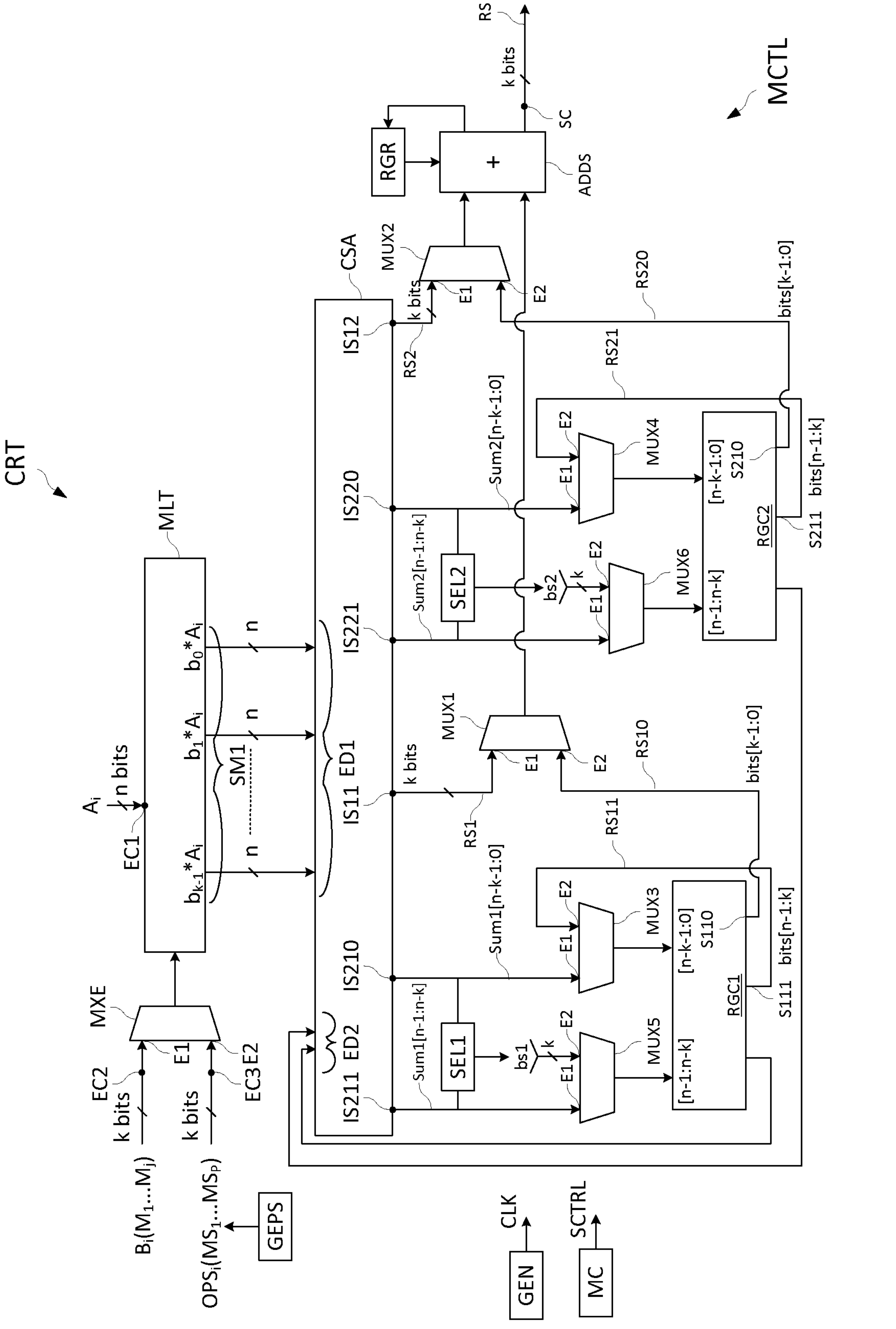

On FIG. 1, the reference CRT designates an electronic multiplication circuit comprising a first circuit input EC1 for receiving a succession of first operands Ai of n bits.

The circuit CRT also includes a second circuit input EC2 for receiving a succession of second operands Bi.

In this example, each second operand Bi includes J words M1 . . . Mj each of k bits.

The circuit CRT also includes a third circuit input EC3 for receiving a succession of supplementary operands OPSi including in this example P supplementary words MS1 . . . MSp each of k bits.

The value n is a multiple of k.

By way of non-limitative example, n may be equal to 16 and k may be equal to 8.

In this embodiment, the successive supplementary operands OPSi are generated pseudo-randomly by a pseudo-random generator GEPS with a conventional structure and known per se.

The circuit CRT also includes a multiplier stage MLT with a conventional structure known per se, having an input EC1 forming the first circuit input and intended to receive in parallel the n bits of each first operand Ai.

The multiplier stage MLT is moreover connected selectively either to the second circuit input EC2 or to the third circuit input EC3 by using an input multiplexer MXE having a first input E1 connected to the second circuit input EC2 and a second circuit input E2 connected to the third circuit input EC3.

Whether for a word of the second operand Bi or a supplementary word of the supplementary operand OPSi, the multiplier stage MLT is configured to produce all the partial products of the k bits b0-bk−1 of this word with the n bits of the first operand Ai.

The multiplier stage MLT has a multiplier output SM1 delivering in parallel these k signals of partial products each of n bits.

The output of the multiplexer SM1 is connected to a first input interface ED1 of a carry save adder stage CSA with a conventional structure known per se.

More precisely, a carry save adder stage includes a set of adders and shift registers for making, with the corresponding shifts, all the additions of the partial products corresponding to the multiplication operation.

The structure of such an adder stage CSA is well known to a person skilled in the art and the latter will for example be able to refer to the work by Parhami Behrooz, entitled "Computer arithmetic: algorithms and hardware designs" (2nd edition), 2010, New York Oxford University Press.

The circuit CRT moreover includes a circuit output SC connected to a first output interface IS11, IS12 of the adder stage CSA.

The circuit CRT also comprises an accumulation stage including here two accumulation registers RGC1 and RGC2 each having a size of n bits. This accumulation stage is looped between a second output interface IS211, IS210, IS220 and IS221 of the adder stage CSA and a second input interface ED2 of this adder stage CSA.

The circuit CRT includes moreover a configurable control circuit MCTL to which we shall return in more detail below with regard to the structure.

This being the case, it can now be noted that the control circuit MCTL has a first configuration and a second configuration.

In the first configuration, the control circuit MCTL is configured, for each first operand Ai and the corresponding second operand Bi, for enabling a first multiplication of the first operand by the second operand, and for making the successive deliveries to the circuit output SC of the least significant word or words of the result RS of the first multiplication from successive extractions of data RS1, RS2 from the first output interface of the adder stage, as well as a storage of data representing the most significant word or words of the result of this first multiplication in the accumulation stage RGC1, RGC2.

In the second configuration, the control circuit MCTL is configured for authorizing a second or false multiplication of the first operand Ai by a supplementary operand OPSi including a sequential extraction from the accumulation stage RGC1, RGC2 of the data RS10, RS20 representing the most significant word or words of the result of the first multiplication.

In general, the supplementary operands OPSi, respectively associated with the first operands Ai, are not all identical, in particular when they are sent by a pseudo-random generator GEPS and can because of this be assimilated to any operands Bi.

The circuit CRT moreover includes a control circuit MC, for example implemented by logic circuits, and configured for placing, by using one or more control signals SCTRL, the control circuit in the first configuration and then in the second configuration.

As is well known to a person skilled in the art, the adder CSA contains a plurality of elementary adders and each elementary adder makes an addition while distinguishing addition with carry and addition without carry.

However, as these elementary adders are combined, the outputs of the adder CSA do not distinguish the results of additions without carries and the results of additions with carries.

The outputs of the adder CSA in fact deliver partial sums.

If we return now to the first output interface of the adder CSA, it can be seen that this here includes a first output IS11 connected to the circuit output SC by using elements to which we shall return in more detail below with regard to their nature, and intended to deliver successively least significant words of results RS1 representing a first partial sum produced by the carry save adder stage CSA.

The first output interface of the adder stage CSA includes moreover a second output IS12 connected to the circuit output SC, also by using elements to which we shall return in more detail below with regard to the nature thereof, and intended to deliver successively the least significant words of the corresponding second partial sum RS2.

The second output interface of the adder stage CSA comprises a first output IS210, IS211 intended to successively deliver the other words of the results representing the first partial sum and a second output IS220, IS221 intended to successively deliver the other words of the corresponding second partial sum.

The accumulation stage comprises in this example:

a first accumulation register RGC1 connected as an input to the first output IS210, IS211 by using elements to which we shall return in more detail below with regard to the nature thereof, and a second accumulation register RGC2 connected as an input to the second output IS220, IS221, also by using elements to which we shall return in more detail below with regard to the nature thereof.

The circuit CRT also includes a generator GEN configured to deliver a clock signal CLK intended to time the multiplication circuit CRT.

Thus, in the course of successive cycles of the clock signal, the first output IS11 of the adder stage CSA is intended to successively deliver the least significant words RS1 of k bits while the second output IS12 of the adder stage CSA is intended to successively deliver the least significant words RS2 of k bits of the second partial sum.

The first output IS210, IS211 of the adder stage is here broken down into a first elementary output IS210 and a second elementary output IS211.

The first elementary output IS210 is intended to deliver the n−k least significant bits Sum1[n−k−1:0] of the other successive words of the results representing the first partial sum.

The second elementary output IS211 for its part is intended to deliver the k most significant bits Sum1[n−1:n−k] of these other successive words of the results representing the first partial sum.

The second output IS220, IS221 of the adder stage for its part is broken down into a third elementary output IS220 and a fourth elementary output IS221.

The third elementary output IS220 is intended to deliver the n−k least significant bits Sum2[n−k−1:0] of the other successive words of the corresponding second partial sum.

The fourth elementary output IS221 for its part is intended to deliver the k most significant bits Sum2[n−1:n−k] of these other successive words of the corresponding second partial sum.

The control circuit MCTL comprises an input multiplexer MXE having a first input E1 connected to the second circuit input EC2, a second input E2 connected to the third circuit input EC1 and an output connected to the multiplier stage MLT.

The control circuit MCTL also comprises a first multiplexer MUX1 having a first input E1 connected to the first output IS11 of the first output interface of the adder stage CSA, a second input E2 connected to a first output S110 of the first accumulation register RGC1 intended to deliver k bits RS10 of ranks 0 to k−1 stored in this first accumulation register and an output connected to the circuit output SC by using an output adder ADDS.

This output adder also has an output looped onto one of its inputs by using a carry register RGR intended to store a carry of 1 bit.

The control circuit MCTL also includes a second multiplexer MUX2 having a first input E1 connected to the second output IS12 of the adder stage, a second input E2 connected to a first output S210 of the second accumulation register RGC2 intended to deliver the k bits RS20 of ranks 0 to k−1 stored in this second accumulation register and an output connected to the circuit output SC by using the output adder ADDS.

The control circuit MCTL also includes a third multiplexer MUX3 having a first input E1 connected to the first elementary output IS210, a second input E2 connected to a second output S111 of the first accumulation register RGC1 intended to deliver the n−k bits RS11 of ranks k to n−1 stored in this first accumulation register, and an output connected to the n−k locations of ranks n−k−1 to 0 of the first accumulation register RGC1.

The control circuit MCTL also includes a fourth multiplexer MUX4 having a first input E1 connected to the third elementary output IS220, a second input E2 connected to a second output S211 of the second accumulation register RG2 intended to deliver the n−k bits RS21 of rank k to n−1 stored in this second accumulation register, and an output connected to the n−k locations of ranks n−k−1 to 0 of the second accumulation register.

In this embodiment, the control circuit MCTL also comprises a fifth multiplexer MUX5 having a first input E1 connected to the second elementary output IS211, a second input E2 for receiving k selected bits bs1 and an output connected to the k locations of ranks n−k to n−1 of the first accumulation register RGC1.

Although the selected bits bs1 can be selected using a pseudo-random generator, it is possible, as illustrated in this embodiment, to select the k bits bs1 from for example the bits delivered by the outputs IS211 and IS210 of the adder CSA.

The selection circuit SEL1, for example implemented using logic circuits, can make a pseudo-random selection for example.

The control circuit MCTL also includes in this embodiment a sixth multiplexer MUX6 having a first input E1 connected to the fourth elementary output IS221, a second input E2 for receiving the k selected bits bs2 and an output connected to the k locations of ranks n−k to n−1 of the second accumulation register RGC2.

There also, the k selected bits bs2 can be selected from the bits delivered by the outputs IS221 and IS220. The selection circuit SEL2 can make a selection identical to or different from the selection made by the selection circuit SEL1.

Reference is now made more particularly to FIGS. 2 to 5 to illustrate an embodiment of the multiplication method used in the circuit CRT.

As illustrated in FIG. 2, we take as an example the first operand Ai equal to 85A7 in hexadecimal notation.

The circuit CRT multiplies this first operand by the second operand Bi equal in hexadecimal notation to 40 25 31, for example.

The second operand Bi therefore includes a first word M1 of eight bits (in this example k=8) equal to 31 in hexadecimal notation, a second word M2 of eight bits equal to 25 in hexadecimal notation and a third word M3 of eight bits equal to 40 in hexadecimal notation.

The supplementary operand OPSi in this example includes two supplementary words of eight bits MS1 and MS2 with any contents but different.

As illustrated at the bottom of FIG. 3, the final result RSF of the multiplication of Ai by Bi is equal in this example to 217D2AB7F7.

How this result RSF is obtained will now be described more precisely.

As illustrated on the top part of FIG. 3, the method includes a first phase PH1 here including three cycles of the clock signal CLK, CYCL1, CYCL2 and CYCL3.

At the start of the first phase PH1, all the accumulation registers are initialized to 0 as are all the inputs of the adder stage CSA.

Figure 4:
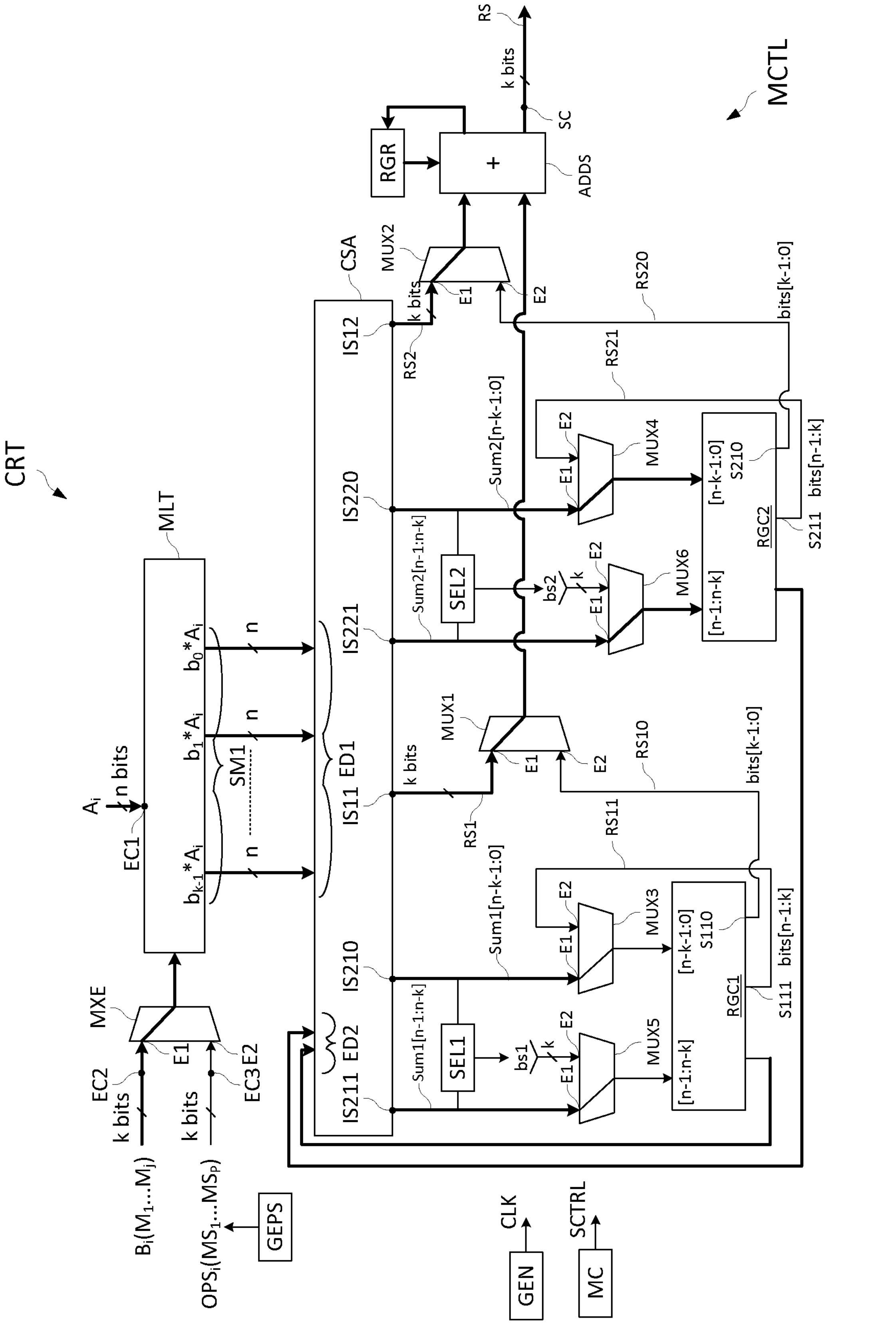

During the first three clock cycles CYCL1, CYCL2 and CYCL3, the control circuit MC places the control circuit MCTL, by using the signal SCTRL, in the first configuration illustrated by bold lines in FIG. 4. In this first configuration, all the first inputs E1 of all the multiplexers are connected to their respective outputs.

The operation of the circuit CRT is then similar to the operation of a conventional multiplication circuit.

More precisely, during the first cycle CYCL1, the first operand Ai equal to 85A7 is delivered on the input EC1 of the multiplier stage MLT while the first word M1 equal to 31 of the operand Bi is delivered on the other input of the multiplier stage MLT.

At the end of this first cycle CYCL1, the eight least significant bits of the result equal to F7 are delivered on the circuit output SC while the binary data representing the most significant words of the result equal here to 1994 are delivered on the outputs IS211, IS210, IS221 and IS220 of the adder stage CSA in order to be stored in the first accumulation register RGC1 and in the second accumulation register RGC2.

In fact, as is well known to a person skilled in the art, with this particular but non-limitative adder stage structure CSA, the sum of the bits delivered on the outputs IS211 and IS210 and of the bits delivered on the outputs IS221 and IS220 is equal to 1994 in hexadecimal notation.

At the second cycle CYCL2, the first operand Ai is still delivered on the input EC1 while the second word M2 of the operand Bi equal to 25 is delivered on the other input of the multiplier stage MLT.

Thus, at the end of this second cycle CYCL2, the least significant byte of the result equal to B7 in hexadecimal notation is delivered on the circuit output SC while the binary data representing the most significant words of the result equal here to 136A are stored in the accumulation registers RGC1 and RGC2.

At the third cycle CYCL3, the first operand Ai is still delivered on the circuit input ENC1 and the third word M3 of the operand Bi, equal to 40, is delivered on the other input of the multiplier stage MLT.

At the end of this third cycle CYCL3, the least significant byte equal to 2A in hexadecimal notation is delivered on the circuit output SC while the binary data representing most significant words of the result equal here to 217D are stored in the accumulation registers RGC1 and RGC2.

It is now necessary to deliver, at the circuit output, the bytes 7D and 21 that are stored in the accumulation registers RGC1 and RGC2 using the supplementary operand OPSi including these two supplementary words MS1 and MS2 with contents of any nature.

Figure 5:
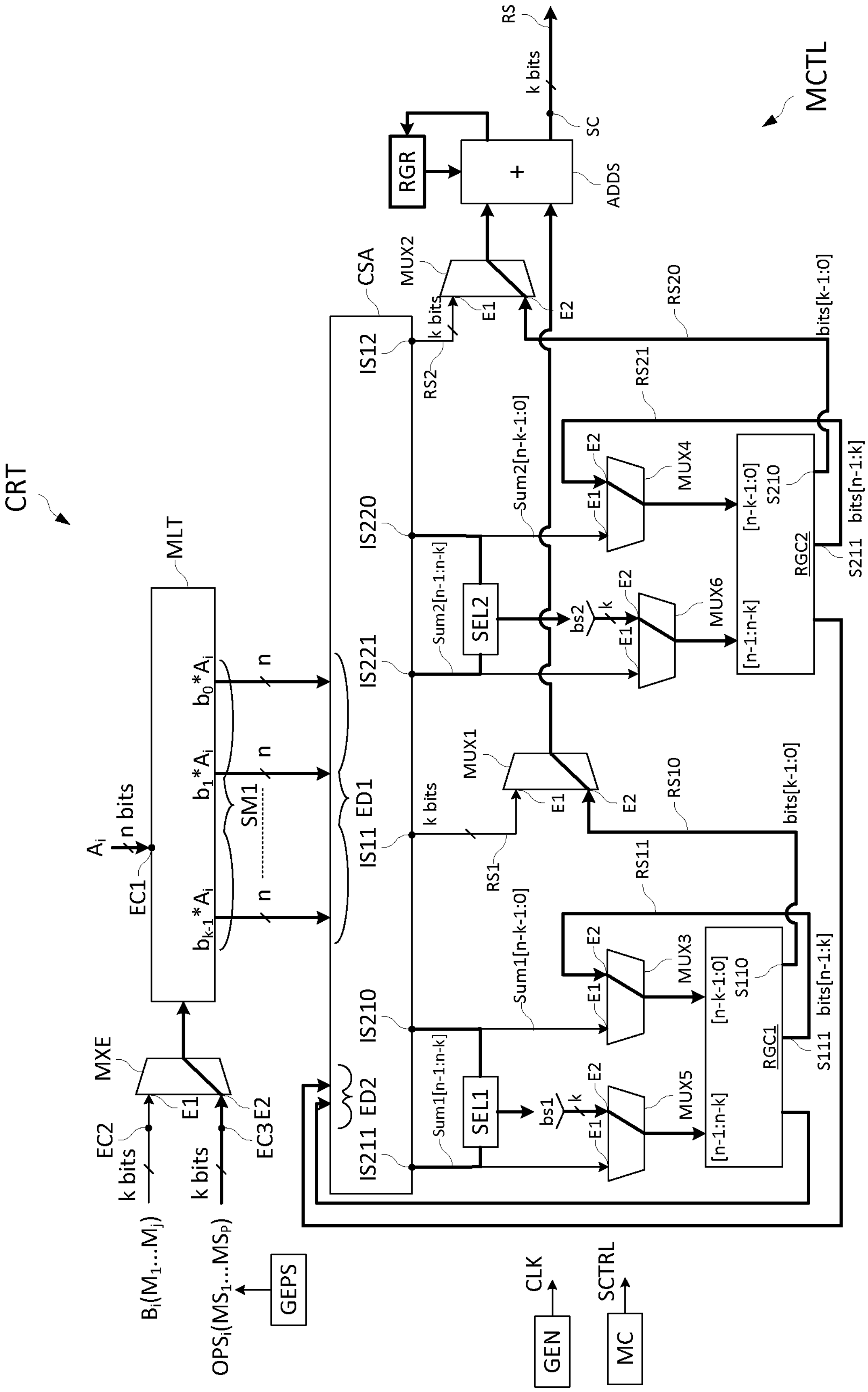

In this regard, as illustrated on the bottom part of FIG. 3, the method includes a second phase PH2 including two clock cycles CYCL4 and CYCL6 wherein the control circuit MC places the control circuit MCTL in the second configuration illustrated by bold lines in FIG. 5.

In this second configuration, it is this time the second inputs E2 of all the multiplexers that are connected to their respective outputs.

At the start of the fourth cycle CYCL4, the data present on the second input interface ED2 of the adder stage CSA correspond to the data that were present in the accumulation registers RGC1 and RGC2 and which corresponded to the multiplication Ai*Bi.

Therefore, it can now be noted that the result of the multiplication Bi by OPSi corresponds to a false or fictitious multiplication.

However, this is of no importance since the data produced by this second multiplication will not overwrite the binary data representing the last two bytes 21 and 7D of the result of the multiplication Ai by Bi, as will now be explained.

This is because, during the cycle CYCL4, the k bits RS10 and RS20 stored in the accumulation registers RGC1 and RGC2 will be delivered to the output adder ADDS by using the first and second multiplexers MUX1 and MUX2, and the adder ADDS will supply, on the output SC, the k bits of the result equal to 7D in hexadecimal notation.

Moreover, the n−k bits (here the eight bits) of rank 8 to 16 stored in the first accumulation register RGC1 will be delivered on the output S111 and reinjected into this first register RGC1 at the locations of rank 0 to 7, by using the third multiplexer MUX3.

The same applies with the bits RS21 stored in the second accumulation register RGC2, which will be re-stored therein at the locations of rank 0 to 7 by using the fourth multiplexer MUX4.

In other words, the data representing the last result byte equal to 21 in hexadecimal notation will now be shifted towards the right and ready to be delivered by using the outputs S110 and S210 of the accumulation registers RGC1 and RGC2, at the following clock cycle.

Moreover, the k most significant bits stored in the first accumulation register RGC1 and in the second accumulation register RGC2 are the bits bs1 and bs2 respectively.

As illustrated schematically in FIG. 3, these bits bs1 and bs2 form together a byte equal to XY, which may not correspond to anything.

At the following clock cycle CYCL5, the binary data RS10 and RS20 are delivered to the output adder ADDS, which delivers the last result word equal to 21 in hexadecimal notation on the circuit output SC.

At the same time, other bits bs1 and bs2 fill the accumulation registers RGC1 and RGC2 which, at the end of the cycle 5, contains the bytes WZXY as illustrated schematically in FIG. 3.

Figure 6:
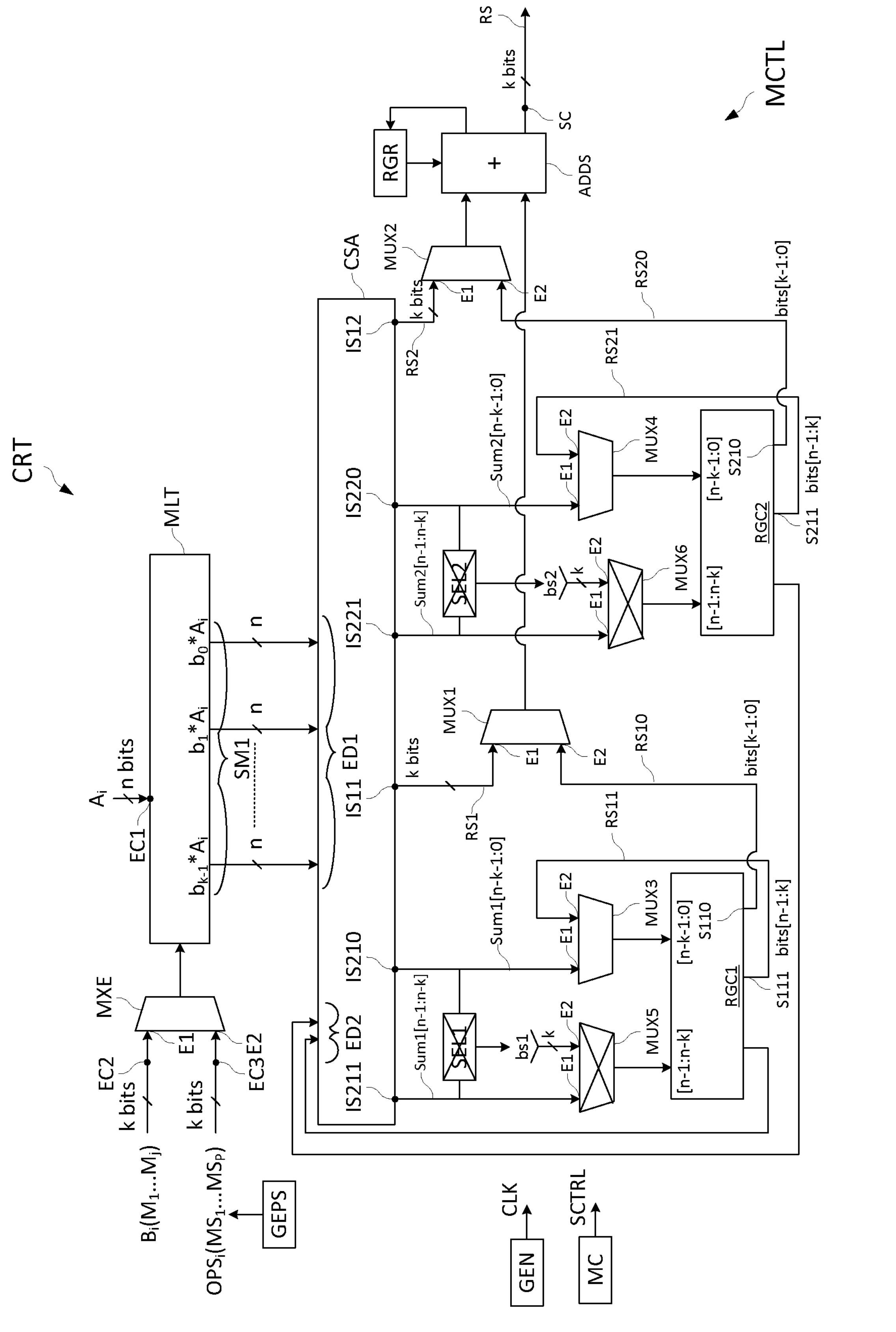

As illustrated in FIG. 6, it would be possible not to use the multiplexers MUX5 and MUX6, or the selection circuit SEL1 and SEL2, and to provide a direct connection CND1 between the elementary output IS211 and the k most significant locations of the first accumulation register RGC1 and to provide a direct connection CND2 between the elementary output IS21 and the k most significant locations of the second accumulation register RGC2.

This embodiment, which is simpler, does however offer less efficacy with regard to the smoothing of the current consumption of the circuit CRT.

Finally, as illustrated highly schematically in FIG. 7, the circuit CRT can be produced in an integrated manner and be incorporated in an integrated circuit IC.

What is claimed is:

1. A method for multiplying a succession of first operands by a succession of second operands using an electronic multiplication circuit comprising a multiplier stage coupled to a carry save adder stage, a circuit output coupled to a first output interface of the carry save adder stage, an accumulation stage looped between a second output interface and an input interface of the carry save adder stage, the method comprising:

for each first operand and the corresponding second operand:

a first multiplication, in the electronic multiplication circuit, in a first phase, of the first operand by the second operand comprising successive deliveries to the circuit output of the least significant word or words of the result of the first multiplication using successive extractions of data from the first output interface and a storage of data representing the most significant word or words of the result of the first multiplication in the accumulation stage;

a second multiplication, in the electronic multiplication circuit, of the first operand by a supplementary operand comprising a sequential extraction from the accumulation stage of the data representing the most significant word or words of the result of the first multiplication, the supplementary operands respectively associated with the first operands not all being identical; and generating, in a second phase, a current consumption substantially equivalent to a current consumption of the first phase to prevent synchronization for side channel attacks.

2. The method of claim 1, wherein the second phase further comprises a selection of bits and a storage of the selected bits in locations of the accumulation stage configured to store the data representing the most significant word or words of the result of the second multiplication.

3. The method of claim 2, wherein the selection of bits comprises a pseudo-random selection.

4. The method of claim 2, wherein the selected bits are selected from the bits delivered by the second output interface.

5. The method of claim 1, wherein the supplementary operands are selected pseudo-randomly.

6. The method of claim 1, wherein each second operand comprises a series of a plurality of digital words, wherein each supplementary operand comprises a succession of supplementary digital words, wherein the first phase comprises a delivery of the plurality of digital words to the multiplier stage, wherein the second phase comprises a delivery of the supplementary digital words to the multiplier stage, and wherein not all the supplementary digital words are identical.

7. The method of claim 6, wherein the supplementary digital words are selected pseudo-randomly.

8. An electronic multiplication circuit, comprising:

a carry save adder stage having a first input interface;

a first circuit input configured to receive a succession of first operands;

a second circuit input configured to receive a succession of second operands;

a third circuit input configured to receive a succession of supplementary operands;

a multiplier stage coupled to the first circuit input and selectively to the second circuit input or to the third circuit input and having a multiplier output coupled to the first input interface of the carry save adder stage;

a circuit output coupled to a first output interface of the carry save adder stage;

an accumulation stage looped between a second output interface and a second input interface of the carry save adder stage;

a configurable control circuit having first and second configurations, wherein, in the first configuration, for each first operand and the corresponding second operand, the configurable control circuit is configured to allow a first multiplication of the first operand by the second operand and to implement successive deliveries to the circuit output of the least significant word or words of the result of the first multiplication from successive extractions of data from the first output interface of the carry save adder stage and a storage of data representing the most significant word or words of the result of the first multiplication in the accumulation stage, and in the second configuration, the configurable control circuit is configured to allow a second multiplication of the first operand by a supplementary operand comprising a sequential extraction from the accumulation stage of the data representing the most significant word or words of the result of the first multiplication, the supplementary operands respectively associated with the first operands not all being identical; and a first control circuit configured to:

place the configurable control circuit in the first configuration, and after placing the configurable control circuit in the first configuration, place the configurable control circuit in the second configuration.

9. The electronic multiplication circuit of claim 8, wherein the configurable control circuit is also configured to make, in the second configuration, a selection of bits, a storage of the selected bits in locations of the accumulation stage configured to store the data representing the most significant word or words of the result of the second multiplication.

10. The electronic multiplication circuit of claim 9, wherein the configurable control circuit is configured to make a pseudo-random selection of the bits.

11. The electronic multiplication circuit of claim 9, wherein the configurable control circuit is configured to make the selection of the bits from the bits delivered by the second output interface of the carry save adder stage.

12. The electronic multiplication circuit of claim 8, wherein the supplementary operands are pseudo-random operands.

13. The electronic multiplication circuit of claim 8, wherein each second operand comprises a series of a plurality of digital words, wherein each supplementary operand comprises a succession of supplementary digital words, wherein the configurable control circuit is configured to deliver, in the first configuration, the plurality of digital words to the multiplier stage, and to deliver, in the second configuration, the supplementary digital words to the multiplier stage, and wherein not all the supplementary digital words are identical.

14. The electronic multiplication circuit of claim 13, wherein the supplementary digital words are pseudo-random words.

15. The electronic multiplication circuit of claim 8, wherein:

the first output interface of the carry save adder stage comprises:

a first output coupled to the circuit output and configured to successively deliver least significant words of results representing a first partial sum produced by the carry save adder stage, and a second output coupled to the circuit output and configured to successively deliver least significant words of a second partial sum produced by the carry save adder stage;

the second output interface of the carry save adder stage comprises:

a first output configured to successively deliver the other words of the results representing the first partial sum, and a second output configured to successively deliver the other words of the corresponding second partial sum; and the accumulation stage comprises:

a first accumulation register coupled as an input to the first output of the second output interface, and a second accumulation register coupled as an input to the second output of the second output interface.

16. The electronic multiplication circuit of claim 15, wherein each first operand is a word of n bits and each second operand comprises a series of digital words of k bits, wherein k is a positive integer greater than 1 and n is a positive integer greater than 1, wherein each supplementary operand comprises a succession of supplementary digital words, wherein the configurable control circuit is configured to deliver, in the first configuration, the series of digital words to the multiplier stage, and to deliver, in the second configuration, the supplementary digital words to the multiplier stage, wherein not all the supplementary digital words are identical, wherein the first accumulation register and the second accumulation register each have a size of n bits, wherein the electronic multiplication circuit is configured for being timed by a clock signal, and, wherein during successive cycles of the clock signal, the first output of the first output interface of the carry save adder stage is configured to successively deliver least significant words of k bits of results representing the first partial sum;

the second output of the first output interface of the carry save adder stage is intended to successively deliver the least significant words of k bits of the corresponding second partial sum;

the first output of the second output interface includes a first elementary output configured to deliver the n−k least significant bits of the other successive words of the results representing the first partial sum, and a second elementary output configured to deliver the k most significant bits of the other successive words of the results representing the first partial sum; and the second output of the second output interface includes a third elementary output configured to deliver the n−k least significant bits of the other successive words of the corresponding second partial sum, and a fourth elementary output configured to deliver the k most significant bits of the other successive words of the corresponding second partial sum.

17. The electronic multiplication circuit of claim 16, wherein the configurable control circuit comprises:

an input multiplexer having a first input coupled to the second circuit input, a second input coupled to the third circuit input, and an output coupled to the multiplier stage;

a first multiplexer having a first input coupled to the first output of the first output interface of the carry save adder stage, a second input coupled to a first output of the first accumulation register configured to deliver the k bits of ranks 0 to k−1 stored in the first accumulation register, an output coupled to the circuit output via an output adder;

a second multiplexer having a first input coupled to the second output of the first output interface of the carry save adder stage, a second input coupled to a first output of the second accumulation register configured to deliver the k bits of ranks 0 to k−1 stored in the second accumulation register, an output coupled to the circuit output via the output adder;

a third multiplexer having a first input coupled to the first elementary output, a second input coupled to a second output of the first accumulation register configured to deliver the n−k bits of ranks k to n−1 stored in the first accumulation register, and an output coupled to the n−k locations of ranks n−k−1 to 0 of the first accumulation register; and a fourth multiplexer having a first input coupled to the third elementary output, a second input coupled to a second output of the second accumulation register configured to deliver the n−k bits of ranks k to n−1 stored in the second accumulation register, and an output coupled to the n−k locations of ranks n−k−1 to 0 of the second accumulation register.

18. The electronic multiplication circuit of claim 17, wherein the second elementary output is directly connected to k locations of ranks n−k to n−1 of the first accumulation register and the fourth elementary output is directly connected to k locations of ranks n−k to n−1 of the second accumulation register.

19. The electronic multiplication circuit of claim 17, wherein the configurable control circuit further comprises:

a fifth multiplexer having a first input coupled to the second elementary output, a second input configured to receive k selected bits and an output coupled to k locations of ranks n−k to n−1 of the first accumulation register; and a sixth multiplexer having a first input coupled to the fourth elementary output, a second input configured to receive the k selected bits and an output coupled to the k locations of ranks n−k to n−1 of the second accumulation register.

20. The electronic multiplication circuit of claim 17, wherein the configurable control circuit is configured to couple the respective first inputs of the input, first, second, third, fourth, fifth, and sixth multiplexers to the respective outputs of the input, first, second, third, fourth, fifth, and sixth multiplexers in the first configuration, and to connect the respective second inputs of the input, first, second, third, fourth, fifth, and sixth multiplexers to the respective outputs of the input, first, second, third, fourth, fifth, and sixth multiplexers in the second configuration.

21. The electronic multiplication circuit of claim 20, wherein n is a multiple of k, each second operand comprises a series of J digital words, each supplementary operand comprises a succession of P supplementary digital words, with P equal to n/k, and the first control circuit is configured to place the configurable control circuit in the first configuration during J cycles of the clock signal and then in the second configuration during P cycles of the clock signal subsequent to the J cycles of the clock signal.

22. An electronic multiplication circuit, comprising:

a carry save adder stage;

an input configured to receive a succession of first operands, a succession of second operands, and a succession of supplementary operands;

an output configured to deliver a result of multiplying a succession of first operands by a succession of second operands;

a multiplier stage coupled to the input and the carry save adder stage;

an accumulation stage looped between an input of the carry save adder stage and an output of the carry save adder stage;

a configurable control circuit configured to, for each first operand and the corresponding second operand:

allow, in a first configuration, a first multiplication of a respective first operand by its corresponding second operand, implement, in the first configuration, successive deliveries to the output of the least significant word or words of the result of the first multiplication from successive extractions of data from the carry save adder stage, implement, in the first configuration, a storage of data representing the most significant word or words of the result of the first multiplication in the accumulation stage, and allow, in a second configuration, a second multiplication of the respective first operand by a supplementary operand comprising a sequential extraction from the accumulation stage of the data representing the most significant word or words of the result of the first multiplication, the supplementary operands associated with the first operands not all being identical; and a first control circuit configured to:

place the configurable control circuit in the first configuration, and place the configurable control circuit in the second configuration after placing the configurable control circuit in the first configuration.

* * * * *